Feb. 4, 1969

A. HONIGMAN 3,425,391

TRIPLEX PRESSURE GAUGE

Filed March 23, 1966

INVENTOR.
ALLAN HONIGMAN

BY

ATTORNEY

3,425,391
Patented Feb. 4, 1969

3,425,391
TRIPLEX PRESSURE GAUGE
Allan Honigman, Cherry Hill, N.J., assignor to the United States of America as represented by the Secretary of the Navy
Filed Mar. 23, 1966, Ser. No. 538,180
U.S. Cl. 116—129                               2 Claims
Int. Cl. G09f 9/00; G01l 7/04, 19/12

ABSTRACT OF THE DISCLOSURE

The present invention relates to a novel and improved multiplex fluid pressure gauge that measures and compares a plurality of independent fluid pressure loads simultaneously. The improved multiplex gauge includes a plurality of Bourdon type pressure sensitive tubes mounted one above the other and a pointer for each pressure sensitive tube, each pointer being connected to its respective pressure sensitive tube and positioned and contoured so as to rotate on an axis common with each of the other pointers and in a plane in parallel with and adjacent the other pointers above a common pressure calibrated dial.

---

The invention described herein may be manufactured and used by or for the Government of the United States of America for governmental purposes without the payment of any royalties thereon or therefor.

In the art of using steam at high pressure to catapult aircraft from the flight deck of an aircraft carrier, the pressure of the steam in the main steam accumulator of the catapult device must be accurately regulated and controlled at all times. Highly accurate and reliable pressure readings of the steam pressure in the accumulator are therefore mandatory. A mechanical or other failure of a single pressure indicating instrument used to monitor the pressure of the steam in the accumulator must be avoided. The readings of three independent high pressure gauges are therefore ordinarily used and compared to guarantee the accuracy of measurement of pressure in the accumulator. Considerable difficulty and inconvenience, however, have been experienced heretofore in the use of three separate instruments in this manner.

It is therefore a principal object of the present invention to provide novel and improved apparatus wherein the readings of a plurality of separate pressure indicating instruments are readily simultaneously noted and compared.

It is a further object of the present invention to provide a novel and improved multiplex pressure gauge wherein its plurality of pressure indicating pointers are associated with a single pressure calibrated dial.

Figure 2:
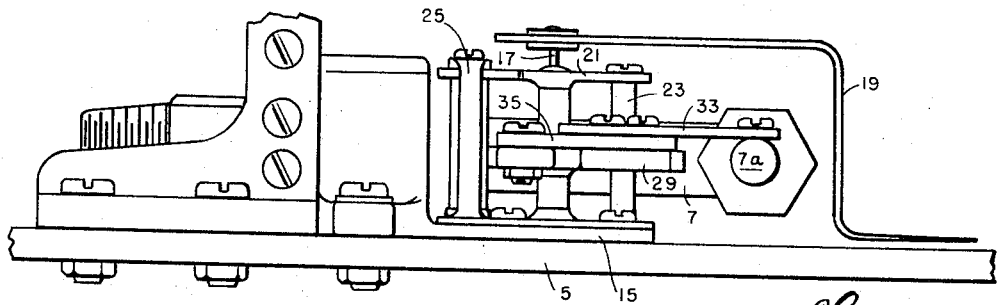
Figure 1:
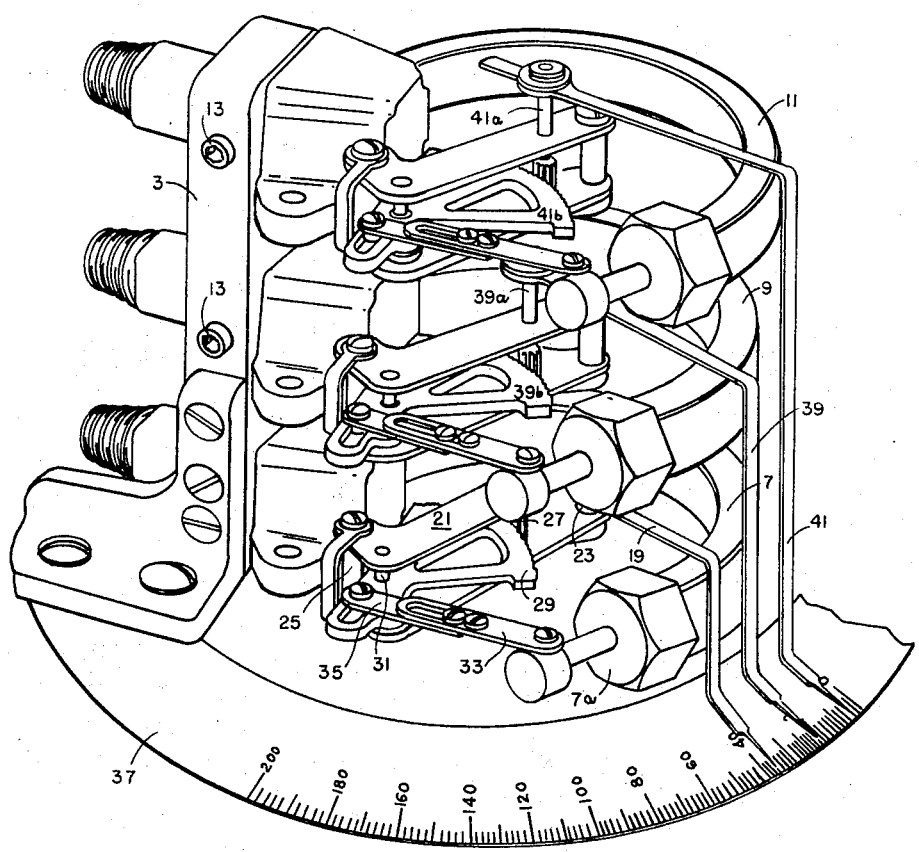

Other objects and many of the attendant advantages of this invention will be readily appreciated as the same becomes better understood by reference to the following detailed description when considered in connection with the accompanying drawing wherein:

FIG. 1 is a perspective view of a preferred embodiment of the present invention; and FIG. 2 is a side elevational view of a portion of the embodiment shown in FIG. 1.

Referring now to the drawing, it will be noted that the Bourdon tube support member 3 is secured to the base of the instrument casing 5 and extends upwardly therefrom. Bourdon tubes 7, 9 and 11 are positioned in the three vertically aligned apertures in the support member and are removably secured therein by locking set screws or the like 13. The fixed fluid input end of Bourdon tube 7 includes an integral horizontally disposed flange or support plate 15 on which the mechanism for translating the lateral expansion-contraction movement of the tube into the rotary movement of its pointer is mounted. Thus, the shaft 17, on which pointer 19 is fixed, is rotatably mounted in a journal in the plate 15 and in a bearing in an aperture in a generally L-shaped plate 21 that is fixed in a position above plate 15 by post members 23 and 25. Pinion gear 27 is secured to shaft 17 between the base plate 15 and the L-shaped plate 21. The geared sector 29 is secured to shaft 31 which is also rotatably journaled between base plate 15 and L-shaped plate 21. The teeth on sector 29 mesh with the complentary teeth of pinion gear 27 on shaft 17. The free end of Bourdon tube 7 is mechanically coupled to the sector 29 by means of link members 33 and 35. Elongated slots in link members 33 and 35 and in the end of sector 29 permit ready adjustment and control of conversion of the lateral expansion and contraction movement of tube 7 to rotation of the sector 29 on shaft 31. The annular pressure calibrated dial plate 37 is mounted on the base of the instrument casing 5.

Bourdon tubes 9 and 11 and their associated mechanisms whereby their free ends are coupled to pointers 39 and 41 are substantially identical to the mechanism described hereinabove that couples Bourdon tube 7 to its pointer 19. Each of the pointers 19, 39 and 41 of Bourdon tubes 7, 9 and 11 are bent downwardly so that their pressure indicating extremities rotate in adjacent parallel planes above the pressure indicating dial 37.

In operation, when fluid pressure is applied to the interior of Bourdon tube 7, its free extremity 7a is flexed outwardly away from the adjacent end of sector 29. When this occurs, the link interconnection between the sector 29 and the tube 7 causes the sector 29 to rotate about its shaft 31. The teeth of sector 29 in meshing with those of pinion gear 27 thereby produce rotary movement of the pointer 19 on shaft 17. Adjustment of the coupling between links 33 and 35 and between link 35 and the end of sector 29 controls the degree and the linearity of rotation of the pointer 19 as the Bourdon tube 7 expands and contracts predetermined amounts. Direct readings of pressure of the fluid applied to the tube 7 are made on the precalibrated dial 37. Pressures applied to Bourdon tubes 9 and 11 similarly respectively produce rotary movement of pointers 39 and 41 on shafts 39a and 41a through sectors 39b and 41b. The downwardly bent configurations of pointers 19, 39 and 41, whereby the pressure indicating extremities of each of the pointers rotate in adjacent parallel planes, facilitate accurate simultaneous readings of any of the pressures applied to tubes 7, 9 and 11 on the single pressure calibrated dial 37.

It is to be understood that, although but three Bourdon tube mechanisms have been shown and disclosed hereinabove, any greater or less number of Bourdon tube mechanisms could similarly be mounted one above the other without departing from the spirit or scope of the present invention.

Obviously, many modifications and variations of the present invention are possible in the light of the above teachings. It is therefore to be understood that within the scope of the appended claims, the invention may be practiced otherwise than is specifically described.

What is claimed is:
1. A multiplex pressure gauge comprising:
   (a) a support member;
   (b) a plurality of vertically spaced fluid inlet means, forming part of said support member;
   (c) a plurality of Bourdon type pressure sensitive tubes, one end of each of said tubes being connected to a respective fluid inlet means;
   (d) a plurality of pointer support means mounted on said support member and positioned proximate a respective one of said fluid inlet means;
   (e) an arbor member rotatably mounted on each said pointer support means;

(f) means connecting the other end of each of said tubes to a respective arbor means;

(g) a pointer mechanically coupled to each said arbor means for rotation therewith, each said pointer having an end portion bent out of its normal plane of rotation so as to rotate in a plane juxtaposed to and parallel with the plane of rotation of the other end portions;

(h) and a pressure dial mounted on said support member common to and registering with each of said pointers.

2. A multiplex pressure gauge substantially as described in claim 1 wherein the means for connecting each Bourdon tube to its respective arbor member includes an adjustable link and wherein the mechanical coupling between each arbor member and its respective pointer includes a pinion gear which is mounted on and rotates with the pointer and meshes with teeth on the arbor member.

References Cited

UNITED STATES PATENTS

| | | |
|---|---|---|
| 1,352,719 | 9/1920 | Baldwin. |
| 2,123,376 | 7/1938 | Moeger _____ 73—432 |
| 2,156,085 | 4/1939 | Dardani. |
| 2,228,497 | 1/1941 | Witchger _____ 116—129 XR |
| 2,407,154 | 9/1946 | Hildebrand et al. __ 116—129 XR |
| 2,443,745 | 6/1948 | Montgomery _____ 116—124.1 |
| 2,597,939 | 5/1952 | Lamb _____ 116—129 |
| 2,639,686 | 5/1953 | Duncan _____ 116—129 |
| 2,732,716 | 1/1956 | Smith _____ 73—411 |
| 2,989,863 | 6/1961 | Camilli et al. _____ 73—49.3 |
| 3,040,698 | 6/1962 | Gray _____ 116—129 |

LOUIS J. CAPOZI, *Primary Examiner.*

U.S. Cl. X.R.

73—412; 116—70